United States Patent [11] 3,630,129

[72] Inventors Alex T. Gow
Dunstable, England;
Helmut Ettischer, Ruit, Württemberg,
Germany
[21] Appl. No. 91,409
[22] Filed Nov. 20, 1970
[45] Patented Dec. 28, 1971
[73] Assignee Eastman Kodak Company
Rochester, N.Y.
[32] Priority Nov. 22, 1969
[33] Germany
[31] P 19 58 699.3

[54] CAMERA MECHANISM FOR ACTUATING MECHANICALLY FIREABLE FLASH UNITS
2 Claims, 5 Drawing Figs.
[52] U.S. Cl. .................................................. 95/11.5 R,
95/11 V, 240/1.3, 431/93
[51] Int. Cl. .................................................. F21k 5/02,
G03b 15/04
[50] Field of Search ............................................. 95/11, 11.5,
11 V; 240/1.3, 37.1; 431/92, 93

[56] References Cited
UNITED STATES PATENTS
3,544,250 12/1970 Beach ........................... 431/93
3,576,155 4/1971 Beach ........................... 95/11.5
3,576,156 4/1971 Michatek ..................... 95/11.5

Primary Examiner—Samuel S. Matthews
Assistant Examiner—Robert P. Greiner
Attorneys—Robert W. Hampton and Leonard W. Treash ABSTRACT: A camera mechanism is provided with a single multipurpose member adapted to (1) disable flash mode assemblies during daylight operation; (2) position an actuator bar in ready-for-firing engagement with a mounted, mechanically actuable flash unit; (3) act in coupling the shutter driver and an actuator member to actuate the flash unit in synchronism with shutter operation; (4) control the signaling of an inoperative flashlamp indicator; and (5) retract the actuator member to facilitate reorientation of multilamp flash units.

CAMERA MECHANISM FOR ACTUATING MECHANICALLY FIREABLE FLASH UNITS

CROSS-REFERENCES TO RELATED APPLICATIONS

Reference is made to commonly assigned, copending U.S. Pat. application Ser. No. 765,926 filed Oct. 8, 1968, entitled PERCUSSION ACTIVATABLE UNITS HAVING INDIVIDUAL STRIKER ELEMENTS AND PHOTOGRAPHIC APPARATUS FOR USING SUCH UNITS, filed in the name of David E. Beach; and commonly assigned, copending U.S. Pat. application Ser. No. 767,145 filed Oct. 14, 1968, entitled CONTROL, SIGNAL AND ACTUATING MECHANISM FOR USE WITH PHOTOFLASH LAMP UNITS HAVING PRE-ENERGIZED STRIKERS, filed in the name of Edward L. Sturm.

BACKGROUND OF THE INVENTION

Field of the Invention

The present invention relates to photographic cameras and camera mechanisms usable with flash devices employing percussively ignitable flashlamps and more particularly to mechanisms for synchronizing camera shutter operation and the actuation of such flash devices.

Description of the Prior Art

It is well known in the photographic art to use electrically fired flash devices to supplement the natural light available for picture taking. While electrically fired flash devices have provided generally satisfactory results, it has proven difficult to design firing systems which are economical of manufacture and have high reliability desirable in this application. Battery deterioration and corrosion of electrical contact surfaces work together in undermining the dependability of electrical firing systems, all to the exasperation of the camera user.

To provide for more dependable flash photography by obviating the need for inherently troublesome electric energy sources and circuits, percussively ignitable flash lamps have recently been developed.

Such lamps and suitable flash units for their use are disclosed in U.S. application ser. No. 765,026, filed in the name of David E. Beach. More particularly, this application discloses a flash unit utilizing percussively ignitable flash lamps and preenergized lamp strikers which are mechanically released along with sophisticated camera mechanisms for use therewith.

One of the important features of this design is disclosed in U.S. Pat. application Ser. No. 767,145, filed Oct. 11, 1968, in the name of Edward L. Sturm, entitled CONTROL, SIGNAL AND ACTUATING MECHANISM FOR USE WITH PHOTOFLASH LAMP UNITS HAVING PRE-ENERGIZED STRIKERS, which shows that the presence or absence of a striker in its preenergized condition can be easily sensed and the result of such sensing indicated to the camera operator. However, the design of mechanical structure for effecting synchronized flash and shutter operation while including this sensing and indicating feature has proven difficult, especially within the constraints imposed in producing less expensive cameras.

SUMMARY OF THE INVENTION

It is an object of the present invention to provide an inexpensive mechanism for synchronizing operation of a camera shutter and actuation of a mechanically actuable flashcube which is simple of design, rugged in use and inexpensive of manufacture.

It is a further object of the present invention to provide such a mechanism which includes provision for inoperative lamp signaling and for retraction of the flash-actuating member to a position within the camera to permit indexing of the flashcube.

These and other objects and achieved by provision of a single multipurpose member controlling a large number of these functions, thus avoiding parallel linkages and permitting positive and dependable transfer between flash and normal operation.

In accordance with a preferred embodiment of the present invention, a mechanism is provided for use in cameras adapted to receive mechanically actuable flash units, which mechanism has a multipurpose member urged to a disabled position during normal operation and freed, in response to mounting of a flashcube, to move a sensing and firing member in determining the operability of the flash lamp at the firing station, to control an indicator of lamp operability, to transfer operative energy from the shutter driver to the sensing and firing member for synchronously actuating the flashlamp at the firing station and to retract the sensing and firing member to permit reorientation of the flashcube in order to position a fresh flash lamp at the firing station.

The invention, and its objects and advantages, will become more apparent in the detailed description of the preferred embodiment presented below.

DESCRIPTION OF THE PREFERRED EMBODIMENTS

Because photographic cameras are well known, the present description will be directed in particular to elements forming part of, or cooperating more directly with, apparatus in accordance with the present invention. It is to be understood that camera elements not specifically shown or described may take various forms known to those skilled in the art.

Figure 1:
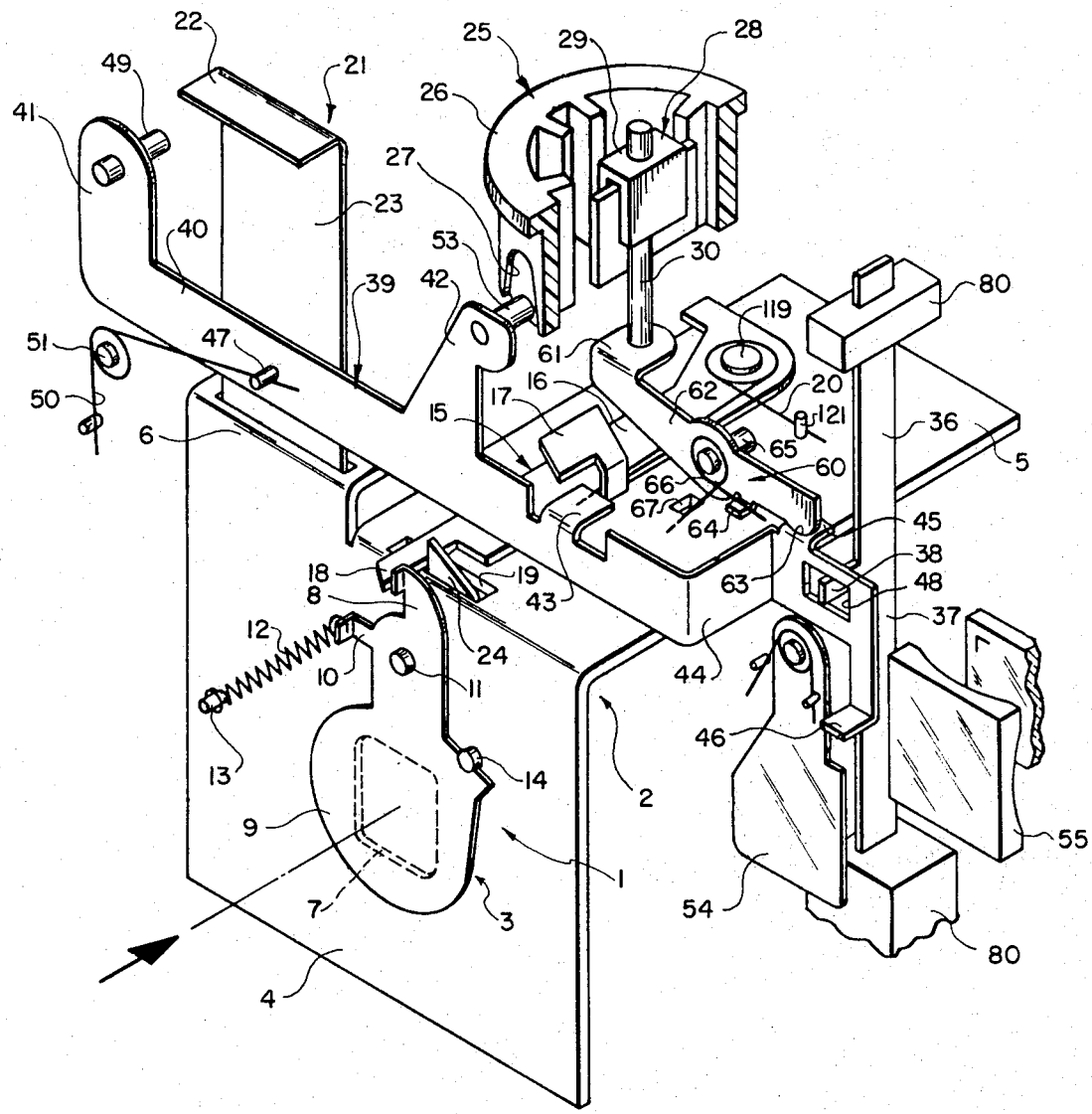
FIG. 1 is a perspective view of a camera mechanism with portions removed to better illustrate the present invention. The mechanism elements are shown in their preoperative positions for the normal mode of operation.
Figure 2:
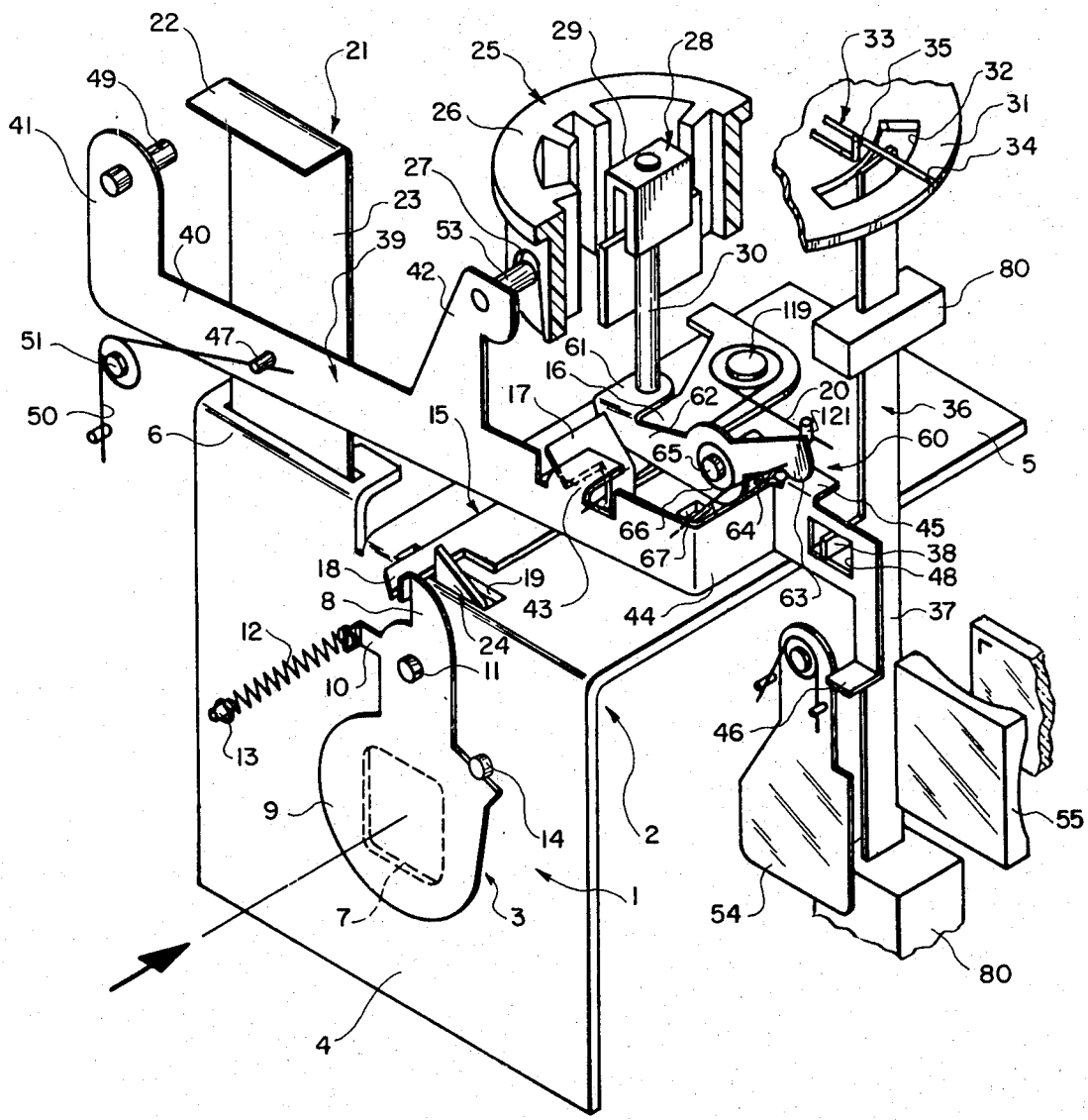
FIG. 2 corresponds to FIG. 1 but illustrates the positions of the mechanism elements for the flash mode of operation.

Referring to FIGS. 1 and 2, the presently preferred embodiment of the invention is shown.

Entry of light to the film plane (not shown) is controlled by means of an exposure assembly 1. Exposure assembly 1 comprises a support member 2 which is rigidly mounted within the camera body and an impact-type shutter member 3.

Support member 2 comprises a substantially vertical portion 4 located toward the front of the camera, a substantially horizontal portion 5 extending rearwardly of the vertical portion, and a slotted portion 6 extending above and rearwardly of the vertical portion. Vertical portion 4 includes an aperture 7 for permitting scene illumination to reach the sensitized film.

Control of light entering aperture 7 is accomplished by shutter member 3 which comprises a drive arm portion 8, a blade portion 9, and a spring tab 10. Shutter member 3 is pivotally mounted to support member 2 by means of a stud 11 and is disposed with blade portion 9 covering aperture 7 for the closed position illustrated in FIGS. 1 and 2. Spring 12 is connected between stud 13 and spring tab 10 is tensioned to urge shutter member 3 in the counterclockwise direction (as viewed in FIGS. 1 and 2) to the closed position wherein further counterclockwise motion of the shutter member is arrested by a stop pin 14 which is rigidly secured to the camera body.

Energization of shutter member 3 to accomplish an exposure oscillation from the closed position is effected by means of shutter driver 15 which comprises a main portion 16, a slanted cam or striking surface 17 extending above the main portion, and a striking finger 18. Shutter driver 15 is pivotally mounted to portion 5 of support member 2 by means of a rivet 119 and is shown in the cocked position in FIGS. 1 and 2. A hairpin spring 20 is mounted on rivet 119 and is tensioned between cam tab 17 and pin 121 to urge operative motion of shutter driver 15 in the counterclockwise direction as viewed from above) from the cocked position. Striking finger 18 extends sufficiently from rivet 119 to strikingly engage drive arm portion 8 of shutter member 3 during an operative motion.

Operator initiation of a picture taking operation is accomplished by means of release member 21 which comprises a pressure surface 22, a body portion 23, and a latch portion 24. Release member 21 is slidably mounted to the camera body with body portion 23 extending through slotted portion 6 of support member 2 and pressure surface 22 extending externally of the camera body to be accessible to the camera operator. Spring biasing (not shown) urges release member 21 to the preoperative position (shown in FIGS. 1 and 2) wherein latch portion 24 extends through a slot 19 in support member 2 to latchingly engage striking finger 18 of shutter driver 15.

Capability for releasable mounting of a flash unit is provided by receiving means or receptacle 25 which comprises main receiving portion 26 and a T-bar assembly 28. The flash unit and receptacle must be compatible and cooperating elements may be selected from various forms known in the art.

Receptacle 25 is mounted on top of the camera body for rotation to predetermined stop positions by an indexing means, not shown, or by manual turning of the flash unit. These positions establish stations for the lamps of a mounted flash unit, one station being designated the firing station wherein the lamp is oriented to illuminate the object scene. Each lamp may be rotated to the firing station and mechanisms for accomplishing sequential rotation are well known in the art.

T-bar assembly 28 comprises a center post 29 and a T-bar 30. Center post 29 is rigidly secured to main receiving portion 26 and is formed to receive T-bar for sliding motion as shown in FIGS. 1 and 2. The crossbar portion of T-bar 30 is disposed to engage the base of a flash unit upon mounting and is displaced from the raised position shown in FIG. 1 to the lowered position shown in FIG. 2 by the base of a mounted flash unit.

A portion of a mechanically actuable flash unit is shown in FIG. 2. Base 31 (shown in part) of the flash unit includes an access opening 32 through which an actuator device may enter. For each lamp a pretensioned spring striker 33 is provided. Each striker 33 has a striker end 34 which is lodged under tension behind an upturned end 35 and is disposed in a preenergized position to be engageable through access opening 32. Flash operation is initiated when an actuator device enters the access opening and applies force above a threshold level to lift striker end 34 above upturned end 35. Striker end 34 is thereby dislodged or released to move to a firing position to strike and thus fire the percussively ignitable flash lamp. A striker 33 is designated as being operative when at the firing station with striker end 34 in the preenergized position.

Actuation of a mounted flash unit is accomplished by a firing or actuator member 36 which comprises a main bar portion 37 and a drive tab 38. Actuator member 36 is slidably mounted to the camera body by guides 80 and is disposed to permit entry of the access opening corresponding to the lamp at the firing station by the upper end of the bar portion 37. The travel of actuator member 36 is selected to permit the upper end of bar portion 37 to mode tab 45 extending rearwardly to bent portion 44 and a signal control arm 46 extending forwardly from bent portion 44. Bar portion 40 includes a rigidly secured spring stud 47 and bent portion 44 includes an elongated aperture 48. Control member 39 is pivotally mounted to the camera body by means of a stud 49 and is urged in the counterclockwise direction (as viewed in FIGS. 1 and 2) by a hairspring 50. Hairspring 50 is mounted upon stud 51 and is tensioned between spring stud 47 and a stud 52 which is rigidly secured to the camera body. Aperture 48 is disposed with drive tab 38 extending therein, thus coupling the motion of control lever 39 and actuator member 36.

Indication to the operator of the presence of an inoperative flashlamp at the firing station is accomplished by indicating means such as signal flag or blade 54 which cooperates with the camera viewer. A portion of the optical path of the camera viewer is formed by a pair of lenses 55 as shown in FIGS. 1 and 2. Signal blade 54 is pivotally mounted to the camera body by a stud 56 and is disposed to be movable into the optical path of the camera viewer. Hairspring 57 is mounted on stud 56 and is tensioned to urge signal blade 54 from the normal position shown in FIGS. 1 and 2 to a signal position wherein it is visible in the viewer. Positioning of signal blade 54 is controlled by signal control arm 46 which engages the edge of the signal blade.

Disabling of control lever 39 for normal (nonflash) operation is accomplished by disabling means such as a disabling lever 60 comprising a contact surface 61, a main portion 62, a driver end 63, and a spring tab 64. Disabling lever 60 is pivotally mounted to the camera body by means of a stud 65 and is disposed with contact surface 61 in the path of travel of T-bar 30. Driver end 63 extends to permit engagement of disabling tab 45 thereby coupling disabling lever 60 and control lever 39. A relatively strong hairspring 66 is mounted on stud 65 and tensioned between spring tab 64 and the edge of a slot 67 is support member 2 to urge clockwise (as viewed in FIGS. 1 and 2) rotation of disabling lever 60. A disabled position for control member 39 is established when T-bar 30 reaches an upper travel limit within center post 29. In the disabled position no coupling occurs between shutter driver 15 and control lever 39.

With no flash unit mounted, the urging of relatively strong hairspring 66 is transmitted to move control lever 39 to the disabled position, with actuator member 36 correspondingly being moved to the retracted position.

As a result of the coupling between actuator member 36 and the control member 39, insertion of a flash unit in receptacle 25 disposes the actuator member in a sensing position in which it engages an operative striker 33, establishing a corresponding drive position of the control member (see FIG. 2). The drive position so established defines the disposition of elements for producing an operative coupling between shutter driver 15 and control member 39. The coupling is accomplished by follower tab 43 which for the drive position is disposed to extend into the operative path of slanted striking surface 17.

Limiting of the upward travel of actuator member 36 and retraction of the actuator member to within the camera during rotation of receptacle 25 are accomplished by camming means operating through control lever 39; for example, a cam surface 27 which cooperates with a follower 53. Cam surface 27 is disposed on the outer periphery of receptacle 25 to be accessible from within the camera body. Follower 53 is rigidly secured to portion 42 of control lever 39 and extends to engage cam surface 27. Cam surface 27 has substantially identical portions corresponding to each lamp of the flash unit. Each portion comprises a highest section operative when the corresponding lamp is at the firing station and shaped to permit actuator member 36 to dislodge an operative striker 33. A downwardly sloped section becomes operative on rotation of receptacle 25 to cause rapid withdrawal of actuator member 36 to a retracted locus within the camera body. A retention section maintains actuator member 36 at the retracted locus until an upwardly sloped section serves to connect with the highest section corresponding to a new lamp at the firing station.

Intended operation of the preferred camera mechanism embodying the present invention is described for two modes of operation: normal and flash.

Referring to FIG. 1 the preferred mechanism is shown with the elements in their preoperative positions for the normal mode of operation. To initiate operation, the operator pressed downwardly on pressure surface 22 causing release member 21 to move downwardly against spring biasing. Latch portion 24 is carried downwardly to release shutter driver 15 for operative movement. Shutter driver 15 rotates under the urging of spring 20 in an operative path to strike drive arm portion 8 of shutter member 3. Under the impact of shutter driver 15, shutter member 3 rotates in the clockwise direction (as viewed in FIG. 1) from the closed position against the urging of spring 12 thus uncovering aperture 7 to begin an exposure. Return of shutter member 3 to the closed position ending the exposure interval is accomplished through the urging of spring 12.

Referring to FIG. 2 the preferred mechanism is shown with the elements in their preoperative positions for the flash mode of operation. As is illustrated in FIG. 2, mounting of a flash unit withdraws disabling lever 60 from control lever 39 which is freed to move in the counterclockwise direction under the urging of spring 50.

For the condition wherein the lamp at the firing station is used (i.e. has no striker in the preenergized position) motion of control lever 39 is arrested at the signal position by follower 53 which engages cam surface 27. For this condition signal blade 54 is released by signal control arm 46 to move under the urging of spring 57 into the optical path of the camera viewer. The presence of an inoperative lamp at the firing station is thus communicated to the camera user.

For the condition wherein an operative lamp is at the firing station, movement of actuator member 36 is arrested at the sensing position by an operative striker 33 causing control lever 39 to be correspondingly held at the drive position (see FIG. 2). Signal blade 54 is restrained from moving into the viewer optical path by signal control arm 46 of control lever 39.

A picture-taking operation is initiated by depression of camera release 21 in the same manner as for normal operation. Depression of release member 21 causes latch portion 24 to be carried below shutter driver 15 which is then freed to move operatively under the urging of spring 20. Shutter driver 15 strikes shutter member 3 which moves in a clockwise direction (as viewed in FIG. 2) to uncover aperture 7 for an exposure interval terminated by return of the shutter member to the closed position under the urging of spring 12. With control lever 39 in the drive position operative movement of shutter driver 15 is coupled to the control lever through engagement of follower 43 by slanted striking surface 17. Control lever 39 is driven by shutter driver 15 is to the signal position with actuator member 36 correspondingly being driven to the projecting position. In moving to the projecting position actuator member 36 lifts striker end 34 above upturned end 35 actuating the flash unit.

Alternate Embodiment 1

Figure 3:
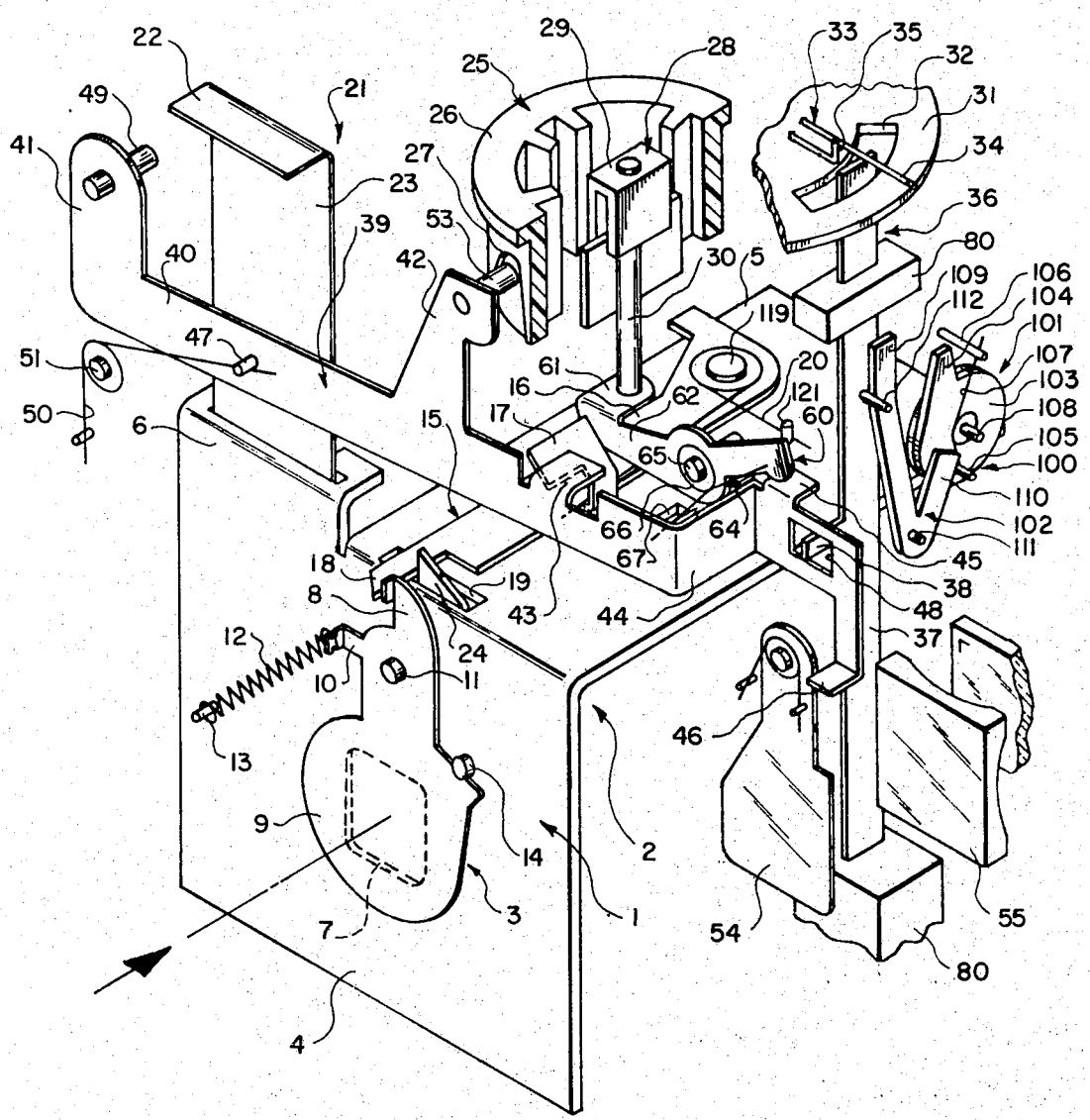
FIG. 3 corresponds to FIG. 2 but includes a modification of the preferred embodiment wherein a braking device is added to provide greater control over motion of the firing member.

An alternate embodiment of the present invention is illustrated in FIG. 3. This embodiment provides a braking assembly 100 for controlling the motion of actuator member 36. By urging against upward movement of actuator member 36, the brake assembly 100 reduces the likelihood of accidentally misfiring the flash unit as a result of momentum developed in the camera mechanism as spring 50, acting through control lever 39, urges the actuator member to the sensing position.

Brake assembly 100 comprises a spring assembly 101 which supplies braking force and a braking lever 102 which interacts with the actuator member. Spring assembly 101 comprises a disc 103 having a stop extension 104, a stud 105 rigidly secured to the disc, a stud 106 rigidly secured to the camera body and a hairspring 107. Disc 103 is mounted to the camera body for axial rotation by means of a stud 108. Hairspring 107 is mounted to stud 108 and is tensioned between studs 105 and 106 to urge disc 103 in the clockwise direction (as viewed in FIG. 3) to the stop position wherein stop extension 104 engages stud 106.

Braking lever 102 is generally V-shaped and comprises a braking arm 109 and a driven arm 110. At the vertex formed by the two arms braking lever 102 is pivotally mounted to the camera body by stud 109. Braking arm 109 extends to permit engagement of stud 112 which is rigidly secured to actuator member 36. Stud 105 engages driven arm 110 and thereby urges braking lever 102 in the counterclockwise direction (as viewed in FIG. 3) against stud 112 of actuator member 36. The action of braking assembly 100 in urging against actuator member 36 reduces the upward speed of the actuator member in moving to the sensing position when a flash unit is mounted or when a new lamp is rotated to the firing station. The reduction in momentum achieved by reducing the speed of actuator member 39 serves to provide a greater margin of safety against a misfiring of the flash unit as motion is arrested by an operative striker 33.

Alternate Embodiment 2

Figure 4:
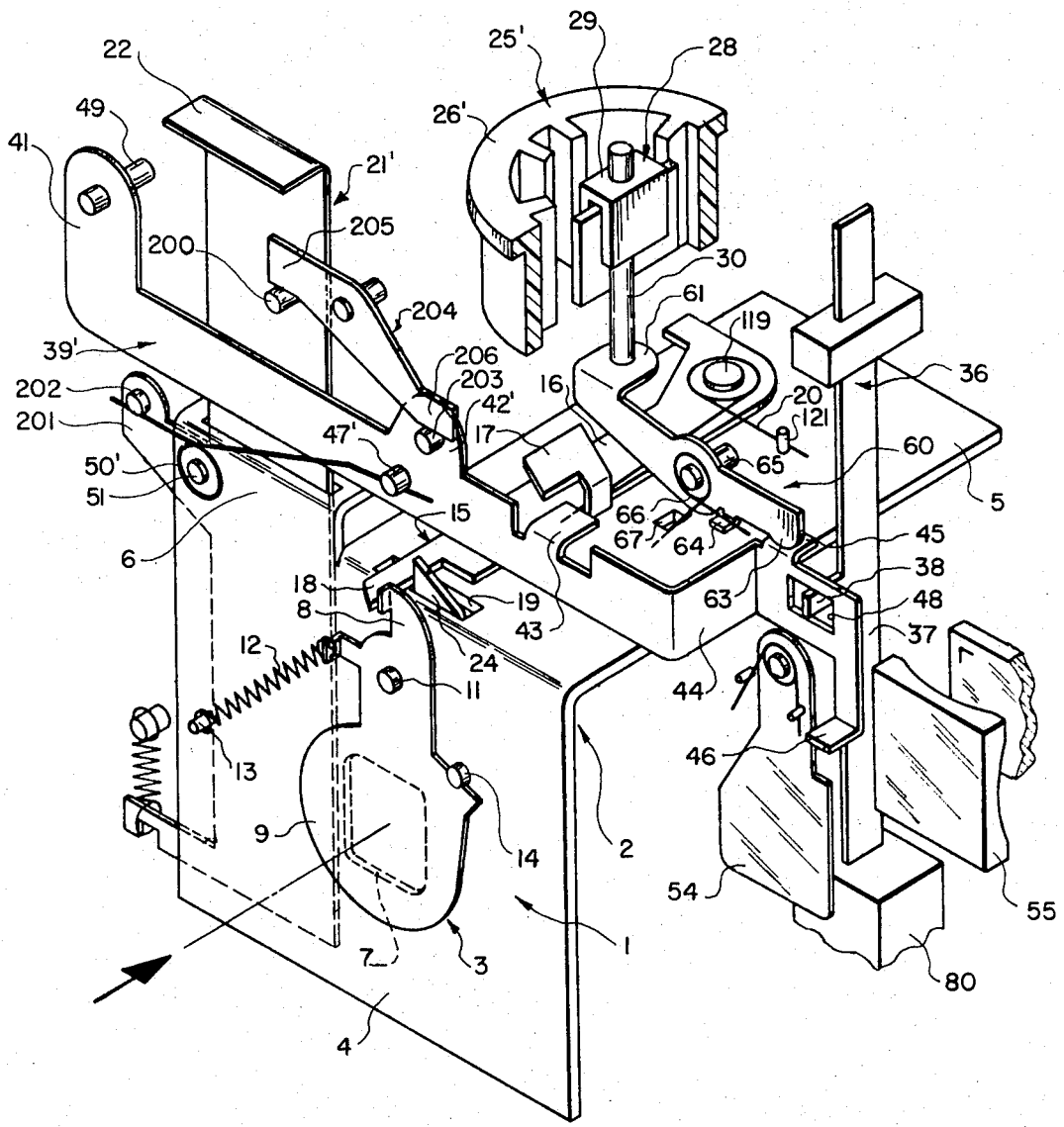
FIG. 4 is a perspective view showing an alternative embodiment of the invention with the elements in their preoperative positions for the normal mode of operation.
Figure 5:
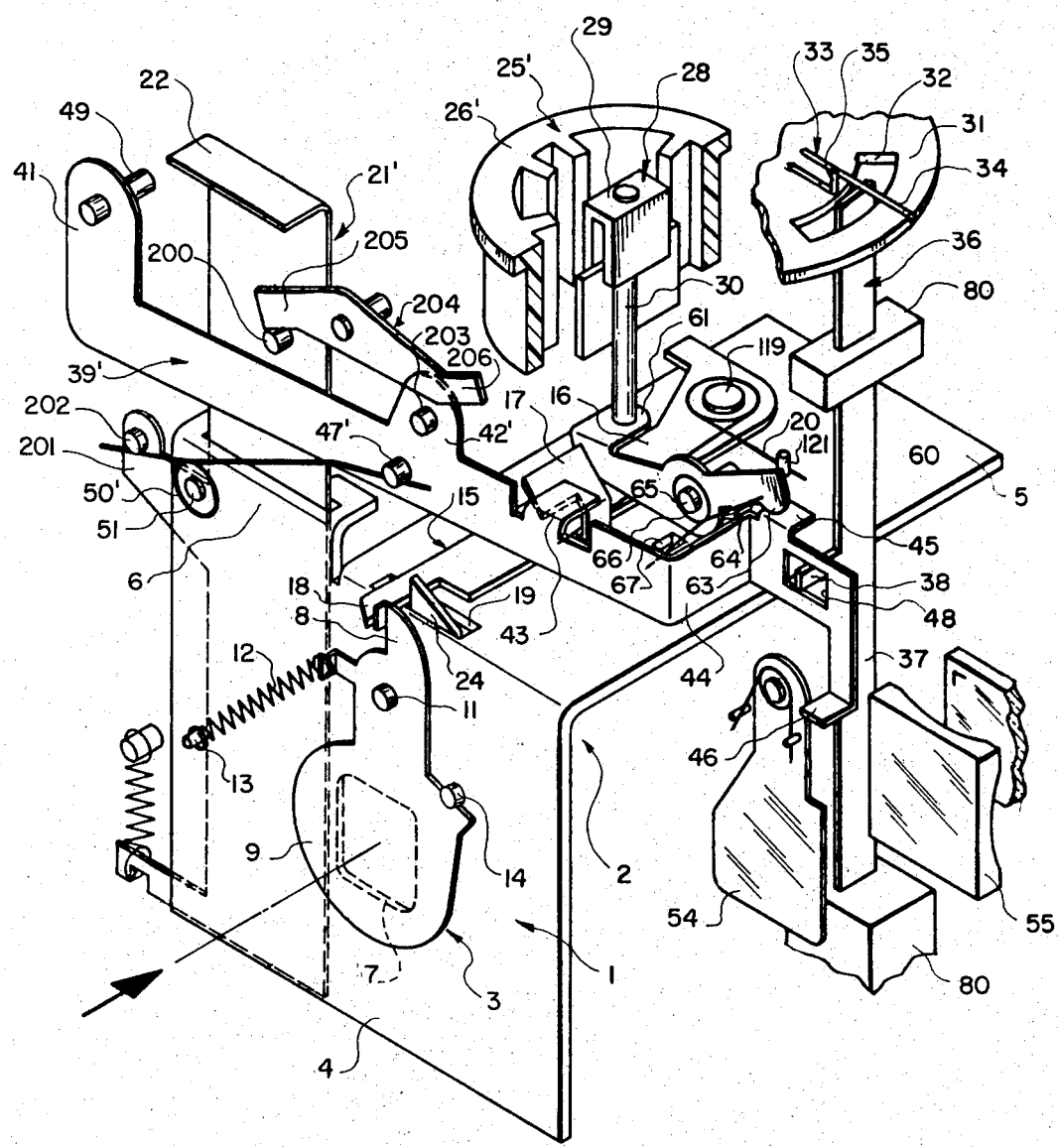
FIG. 5 corresponds to FIG. 4 but illustrates the positions of the mechanism elements for the flash mode of operation.

A second alternate embodiment is illustrated in FIGS. 4 and 5. This modification utilizes lever means actuated off the camera release to retract the actuator member during flash rotation. Elements which have been modified in form as compared to the preferred embodiment have been designated by primed numbers. Added elements have been designated by numbers ranging from 200 to 206.

Camera release 21' is modified to additionally include a rigidly secured retract stud 200 and a spring tab 201 having a rigidly secured spring stud 202. Control lever 39' includes slight modifications as to the form of portion 42' and the positioning of stud 47'. A stud 203 is rigidly secured to portion 42' and extends forwardly of control lever 39'. Spring 50' is mounted on a stud 204 rigidly secured to support member 2 and is tensioned between studs 47' and 202. The modification in spring 50' causes the urging force applied to control lever 39' to be related to the position of camera release 21'. Thus, the further camera release 21' is depressed, the greater the counterclockwise (as viewed in FIG. 4) urging applied to control lever 39'.

for the alternate mechanism, cam surface 27 is not required and retraction is accomplished by such means as lever 204 having a driven end 205 and a drive end 206. Lever 204 is pivotally mounted to the camera body and is disposed with driven end 205 extending to engage stud 200 and drive end 206 extending to engage stud 203.

Intended operation of the mechanism for the normal mode, is essentially the same as for the preferred embodiment.

For the flash mode of operation, mounting of a flash unit, as shown in FIG. 5, withdraws disabling lever 60 from control lever 39' as in the preferred embodiment. Control lever 39' does not move to the drive position under the urging of spring 50', however, because of a downward force applied to stud 203 by lever 204. Lever 204 is prevented from moving in the counterclockwise direction (as viewed in FIG. 5) by stud 200 on camera release 21'. As camera release 21' is depressed, the tension of spring 50' is increased by the downward movement of stud 202, and stud 200 is carried downwardly permitting further rotation of lever 204, and thereby further movement of control lever 39' toward the drive position.

If an inoperative lamp is at the firing station, control lever 39' achieves the position wherein signal control arm 46 releases signal blade 54 to move into the optical path of the camera viewer for indicating the lamp's condition to the camera operator.

Movement of control lever 39' beyond the drive position with an operative lamp at the firing station is prevented by arresting engagement of actuator member 36 by an operative striker 33. Release of the shutter driver and actuation of the flash unit are essentially the same as for the preferred embodiment. Retraction of actuator member 39 after flash actuation is accomplished by return of camera release 21' to the preoperative position, under spring biasing, forcing lever 204 in the clockwise direction (as viewed in FIG. 5). The rotation of lever 204 is coupled to control lever 39' by study 203 which is driven downwardly causing coupled actuator member 36 to move downwardly into the camera body.

In each of the embodiments a single member control lever 39 (a) transmits force from the shutter driver 15 to the actuator member 36 to fire the flash, (b) controls flash, nonflash operation in response to insertion of a flash unit in receptacle 25, (c) controls the sensing position of actuator member 36, whether, as in FIGS. 1-3, this sensing is in response to flash unit insertion or as in FIGS. 4 and 5, is in response to preliminary camera release depression, and (d) controls the position of indicator 54 in response to the sensing position of actuator member 36. This feature of including all of these functions in a single element simplifies the design with resulting savings in cose and in reliability.

The invention has been described in detail with particular reference to preferred embodiments thereof, but it will be understood that variations and modifications can be effected within the spirit and scope of the invention.

We claim:

1. In a photographic camera for use with a mechanically actuable flash unit of the type comprising a plurality of lamps, an individual preenergized striker for each lamp movable from a preenergized position to a striking position for firing such lamp and a base having an access opening for each striker through which the striker can be engaged and released, said camera including:
    a. means for receiving such a flash unit, said means being rotatable to sequentially position individual lamps at a firing site and the respective access openings at an actuating site;
    b. a shutter;
    c. a drive member movable from a first position to a second position to actuate said shutter;
    d. an actuator member movable from a first position through an access opening positioned at said actuating site toward a second position for releasing a preenergized striker associated with the access opening;
    e. indicator means movable from a first position to a second position for indicating the presence of a used bulb at said firing site; and
    f. latch means movable from a first latching position to a second unlatching position in response to receipt of a flash unit in said receptacle;
the improvement comprising:
    g. a unitary multipurpose control member pivotally mounted for movement between first and second positions and including:
        1. means responsive to said latch means for latching said control member in its first position when said latch means is in its first position;
        2. means responsive to said drive member for driving said control member toward its second position while said drive member moves from its first position to its second position;
        3. means coupling said control member and said actuator member for unitary movement from their respective first positions to their respective second positions; and
        4. means associated with said indicator means for controlling movement of said indicator means from its first position to its second position in response to movement of said control member to its second position; and
    h. resilient means for urging said control member from its first position to its second position with a force insufficient to release a preenergized striker when engaged by said actuator member.

2. the improvement according to claim 1 wherein said camera further comprises means defining a cam surface rotatably with said receptacle means and said control member includes a cam follower cooperable with said cam surface for moving said control member to its first position during rotation of said receptacle.

* * * * *